United States Patent [19]
Starr
[11] 3,885,052
[45] May 20, 1975

[54] PROCESS OF PRODUCING A SOY PRODUCT HAVING IMPROVED SORPTION

[75] Inventor: Robert P. Starr, Spanish Lake, Mo.
[73] Assignee: Ralston Purina Company, St. Louis, Mo.

[22] Filed: Nov. 9, 1973
[21] Appl. No.: 414,553

Related U.S. Application Data

[63] Continuation of Ser. No. 144,324, May 17, 1970, abandoned, which is a continuation-in-part of Ser. No. 643,342, June 5, 1967, abandoned.

[52] U.S. Cl. ................ 426/250; 426/148; 426/177; 426/212; 426/224; 426/364; 426/371; 426/382; 426/471
[51] Int. Cl. ............................ A23j 1/14; A23l 1/31
[58] Field of Search ........... 426/148, 205, 212, 224, 426/377, 431, 481, 177, 250, 364, 371, 382, 471

[56] References Cited

UNITED STATES PATENTS

| | | | |
|---|---|---|---|
| 2,762,820 | 9/1956 | Sugarman | 260/412.3 |
| 2,881,076 | 4/1959 | Sair | 426/205 |
| 3,127,388 | 3/1964 | Johnson et al. | 260/123.5 |

OTHER PUBLICATIONS

Ziemba, J. V., "Let Soy Proteins Work Wonders for You," Food Engineering, May 1966, pp. 82–91.

*Primary Examiner*—Raymond N. Jones
*Assistant Examiner*—R. A. Yoncoskie
*Attorney, Agent, or Firm*—Virgil B. Hill

[57] ABSTRACT

The process of preparing a bland, free-flowing, non-hydroscopic soy product with improved liquid sorption and fat binding properties is disclosed; the process involving treatment of substantially dehulled, defatted and desolventized soy meal or flakes with an aqueous-alkaline solution, such as an aqueous calcium hydroxide solution, to solubilize and remove at least about 60% of the aqueous-alkaline soluble substances such as protein and carbohydrate materials from the flakes, separating the extracted soy meal product from the extract and thereafter drying the extracted product under controlled conditions. The resulting soy product is lighter in color, bland in taste and displays significantly improved liquid sorption and emulsifying properties which render it useful as a thickening agent, emulsifying agent, carrier, humectant, bulking agent, or sorbent in industrial or edible applications. The product is particularly useful as an emulsifying agent for a wide variety of food uses and has been found to produce food products having improved emulsion properties when used at the proper levels. An improved food product containing the soy product is also disclosed.

9 Claims, No Drawings

PROCESS OF PRODUCING A SOY PRODUCT HAVING IMPROVED SORPTION

BACKGROUND OF THE INVENTION

This application is a continuation of application Ser. No. 144,324 entitled SOY PRODUCT HAVING IMPROVED SORPTION PROPERTIES AND PROCESS filed on May 17, 1970, which application is a continuation-in-part of U.S. application Ser. No. 643,342 filed June 5, 1967, and are now abandoned.

The present invention is in the field of processes or methods for preparing soy products and more particularly in the field of processes for preparing soy products having liquid sorption and fat binding or emulsifying properties and to improved food products incorporating said soy products.

Heretofore, there have been available various soy materials which have been marketed for industrial and edible purposes and which exhibit water or fat binding properties to some extent. Three such products are those known to the art as soy flour or grits, "Soy Protein Concentrate" and "Isolated Soy Protein." Soy flour represents the entire soy flake with only the oil having been removed from the bean. While this product has proven nutritive properties and has shown some merit for its functional properties as an additive, such as for purposes of moisture retention, for example, it has been subject to definite limitations in its use in formulations due to flavor and other undesirable characteristics. "Soy Protein Concentrate" represents mainly the fibrous and protein fractions of the soy flakes or meal, the bulk of the water-soluble carbohydrate fraction having been removed. "Isolated Soy Protein" represents mainly the protein fraction of soy flakes or meal, both the water-soluble carbohydrate and fibrous fractions having been removed. These "refined" soy products have been offered to the trade for their improved nutritive, flavor and absorptive characteristics. However, there has remained an unfulfilled need for a soy product having equal or superior flavor and nutritive properties as compared with soy products now commercially available, having significantly improved liquid sorption and emulsifying or fat binding characteristics and which can be produced commercially on an economical and competitive basis. It is also known to employ emusifying agents in foods to bind fat and water. However, I have discovered that food emulsion products containing my new soy material have greatly improved properties compared to products heretofore known.

SUMMARY OF THE INVENTION

Therefore, among the several objects of the invention may be noted the provision of a process of preparing a soy product which exhibits significantly improved liquid sorption and emulsifying characteristics rendering the product commercially useful for various edible and non-edible applications; the provision of such a process which produces a soy product of acceptable flavor and nutritive properties for use in various edible formulations; the provision of a process of the type indicated which employs, as the starting material, defatted and dehulled soy meal or flakes and results in the modification of an extracted soy product; the provision of such a process which is economical and reliable to practice on a commercial scale; and the provision of an improved soy product produced by the process. It is also an object of this invention to produce an improved food product having improved emulsion properties and a process for producing the improved food product. Other objects and features will be in part apparent and in part pointed out hereinafter.

The present invention is thus directed to the method of producing a substantially bland, free-flowing nonhydroscopic soy product having improved liquid sorption and emulsifying properties comprising the steps of treating substantially dehulled, defatted and desolventized soy meal with an aqueous alkaline material to solubilize and extract therefrom at least approximately 60% of the aqueous-alkaline soluble substances, separating the resulting extracted soy meal product from the extract and drying the extracted soy meal product under controlled drying conditions to substantially avoid deleterious modification of the cellular structure of said product. The invention is also directed to the novel soy product produced by the process of the invention which is characterized by novel properties and to improved food products incorporating the novel soy product.

DESCRIPTION OF THE PREFERRED EMBODIMENTS

As the starting material in my novel process, I employ substantially dehulled, defatted and desolventized soy meal or spent flakes prepared from sound, clean soybeans. For best results, the meal or flakes should be as free of hulls, weed seeds and trash as is practicable, although it will be understood that useful products may also be prepared in accordance with the invention by employing spent flakes in the form generally available in the trade. Defatting or removal of the oil fraction from the soybeans is carried out by conventional methods through the use of hexane or other similar hydrocarbon solvents, and the solvent extracted product is then desoluentized in the conventional manner known to the art. The resulting dehulled, defatted and desolventized soy meal or flakes preferably have a high dispersible protein content for use in the process of the present invention.

In carrying out the process of the invention, the soy meal or flakes are first treated with an aqueous alkaline agent in order to effect solubilization and removal of the bulk of protein, carbohydrate and any other aqueous-alkaline soluble substances from the defatted flakes. For this purpose, any suitable aqueous-alkaline solvent may be employed. Illustrative alkaline or basic materials which may be utilized include alkali metal hydroxides, such as sodium and potassium hydroxide, alkaline earth hydroxides, such as calcium hydroxide, alkali metal carbonates, such as sodium carbonate, ammonium hydroxide and lime. The extraction treatment may be carried out in one step, or if desired, may involve two or more steps in one of which an aqueous medium containing no alkaline material is utilized as the extracting medium. Typically, the aqueous-alkaline agent employed for extracting the aqueous-alkaline soluble substances may contain approximately 1–2 percent by weight of the alkaline material based upon the weight of the defatted soy flakes. However, it will be understood that the amount of alkaline material in the aqueous-alkaline extracting agent may be varied widely to give the desired removal of the aqueous-alkaline soluble substances as discussed hereinafter. Also, the extraction time may be varied to obtain the desired degree of removal of aqueous-alkaline soluble substances from the starting material. Typically, the extraction time may be 30–60 minutes. Further, heat of up to 180° F. may be applied during the extraction step to expedite extraction of the soluble carbohydrate and proteinaceous materials. It is also preferred to employ known mechanical methods, such as stirring or agitating of the soy meal aqueous-alkaline slurry, during extraction. If desired, an additional extraction of the material may be carried out with a suitable solvent such as alcohol, in order to improve the color or flavor of the final product.

The relative degree of removal of aqueous-alkaline soluble substances from the starting soy meal may be readily ascertained from the dry basis protein analysis of the extracted product separated from the extraction medium following extraction. From a starting value of approximately 57.0 percent (dry basis) protein in the final or end product, successively more thorough extraction or removal of aqueous-alkaline soluble substances may be carried out on the starting material until an extracted product containing only 20–45 percent protein is obtained. The approximate relationship between solubles removal of aqueous-alkaline soluble substances during the extraction step, percentage of residual protein in the final product and yield is indicated in the following table:

| % Protein in Final Product (Dry Basis) | Product Yield (% of Starting Material) | Solubles Removal (% of Starting Material) |
|---|---|---|
| 57.0% | 100% | 0% |
| 50.0% | 57.5% | 42.5% |
| 45.0% | 40.0% | 60.0% |
| 40.0% | 34.0% | 66.0% |
| 35.0% | 28.5% | 71.5% |
| 30.0% | 24.5% | 75.5% |
| 25.0% | 21.0% | 79.0% |
| 20.0% | 16.0% | 84.0% |

From the above relationships, it is apparent that it is of economic advantage to restrict solubles removal and thereby control yield at the highest possible level consistent with product quality. On the other hand, it has been found that the materials which contribute to a deleterious flavor are largely removed as aqueous-alkaline soluble materials in the extraction step and that the amount of protein remaining in the extracted product makes it necessary to carefully control the subsequent drying operation in order to preserve the desired absorptive properties in the final end products. In accordance with the invention, it has been found that a minimum solubles removal of about 60 percent, preferably about 65 percent or more, should be effected in the extraction step in order to produce an end product having improved sorptive and emulsifying properties. In general, I prefer to effect solubles removal of between about 60 to about 85 percent so that the final soy product of the invention has a protein content (dry basis) of between about 20 to about 45 percent.

Following the extraction step and separation of the extract from the extracted product, as by mechanical pressing or other conventional means, the extract may be discarded or, if desired, employed as the starting material for preparing other soy products. In accordance with the invention, the extracted product is then dried under mild or controlled drying conditions so as to avoid deleterious modification of the remaining protein and the cellular structure of the product. By carrying out drying of the extracted product under such controlled conditions, it has unexpectedly been found that a final soy product possessing significantly improved sorption and emulsifying properties is obtained. While various modes of drying may be utilized, it has been found that in general the temperature of the extracted product should not be permitted to exceed approximately 250° F. during the drying operation and should range between about 140° F. and about 250° F. Preferably, the product temperature should range between about 160° F. and 210° F. Optimum results have been obtained, for example, by drying the extracted product in a tunnel dryer at a temperature of 180° F. for a period of about 90 minutes or by spray drying at a temperature of about 180° F. for 5–10 seconds. The higher the temperature employed within the above stated ranges, the shorter the heating period or residence drying time of the extracted product required to effect the desired drying thereof. Conversely, the lower the temperature employed within the above stated ranges, the longer the heated period of residence drying time of the extracted product required to effect the requisite degree of drying. Thus, the drying conditions, i.e. temperature and drying time, should be regulated and controlled as to achieve the necessary degree of drying which preserves the improved sorptive properties of the soy material without deleterious modification of the remaining protein of the extracted product and of the cellular structure of the product.

It is essential that scorching or glazing of the extracted product, such as results from the higher temperatures employed by the prior art in drying, be avoided. Thus, the use of high temperature, long residence time drying operations such as are carried out in rotary kiln equipment known to the trade result in the formation of a completely unsatisfactory product. The combination of rolling action, protein film forming and heat denaturization of the protein produce a case-hardened dried pellet that resists liquid penetration and therefore does not fulfill the objectives of the present invention. The preferred dyring methods are those which expose the maximum surface area of the extracted product to drying air and thereby promote rapid moisture evaporation with a minimum rise in the product temperature so as to avoid degradation of the protein and the cellular structure. Satisfactory products with improved sorptive and emulsifying properties have been obtained, for example, by tunnel drying the extracted product at a temperature of approximately 180° F. for about 1 hour to 90 minutes and by flash or spray drying the extracted product under conditions such that a maximum product temperature of more than about 250° F. is not exceeded. It will be understood that other equivalent drying methods may also be utilized. It should be understood that the time of drying is inversely proportional to the drying temperature. At spray drying conditions, the drying time will be between about 5 to 10 seconds; at low vacuum or tunnel drying temperatures such as 140° F., the time may be as long as 3 hours or more. The drying time as a function of temperature may be expressed by the equation $T = k/t$ where $T$ is temperature in degrees Fahrenheit and $t$ is time. The constant $k$ will depend on the type of drying equipment used and the conditions of operation.

The sorptive and emulsifying properties of the soy products of the invention may be further enhanced by forming the dried residue in such manner as to produce a product form which is highly receptive to liquid absorption. This may be accomplished, for example, by forming the extracted product into granules before tunnel drying within the above stated temperature range and then using the dried product in granular form or, if desired, mechanically reducing the desired product in size to the desired mesh. Also, for example, the extracted product may be spray dried directly to powder form. An illustrative product form and size which has been found satisfactory is 50 mesh powder form, but it will be understood that products having a size of, for example, 12–20 mesh and powders having a size of 200–300 mesh are also useful. However, it will be further understood that other forms and sizes may be employed depending upon the particular end use.

In particular, it has been found that the oil absorption properties of the final soy product are influenced to some extent by the final dry form of the product. This may be determined from the bulk density or microscopic examination of the final product. Thus, if the extracted product is subjected to wet abrasion conditions, such as being forced through small nozzles in spray drying or being impringed on high speed rotary discs in a flash dryer, the material will exhibit a lower bulk density of about 10–22 lb./cu. ft. The material also exhibits some plasticity and appears to have a tendency to flow and fracture into longitudinal pieces. Under dry abrasion conditions, on the other hand, the cellular matter of the material appears to form into relatively regular fragments which pack more densely and therefore possess a higher bulk density on the order of about 22–45 lb./cu. ft. Thus, as shown in Example 5 hereinafter, a soy product of the invention produced in powder form by spray drying, exhibits superior oil absorption properties. While the precise mechanism involved is not fully understood, I believe that the improved oil absorption results from maintenance of capillary wicking of the modified cellular structure of the soy product as produced by my process.

The products obtained through the practice of the invention are non-hygroscopic and free-flowing and exhibit a bland to slight nut cereal flavor, odor and texture which is equal or superior to that of presently available soy products. While the products in the form of finely ground powders are readily dispersible in water, they are not soluble. These products thus avoid many of the drawbacks of soy flour, for example, which possesses an undesirable stickiness or gumminess, texture effects and flavor. The modified cellular, sponge-like character of my novel soy product is evident under microscopic examination. The improved soy product produced by the process of the invention is characterized by the following analysis:

| | |
|---|---|
| Protein (dry basis) | 20 – 45% by weight |
| Moisture | 6.0 – 10.0% by weight |
| Ash | 3.5 – 4.5% by weight |
| pH (water slurry) | 7.0 – 8.5 |
| Bulk density | 10 – 24 lb./cu. ft. |
| Extractables (percentage of product solids removable by further water leaching) | 27.0 – 35.0% |

The soy products of the invention possess a favorable amino acid balance. A typical amino acid analysis for a soy product of the invention is as follows:

| Amino Acid | gm./100 gms. | gm./100 gms. of (100% protein) |
|---|---|---|
| Lysine | 1.79 | 4.99 |
| Histidine | 0.79 | 2.20 |
| Arginine | 1.84 | 5.13 |
| Aspartic | 3.63 | 10.13 |
| Threonine | 1.48 | 4.13 |
| Serine | 1.65 | 4.60 |
| Glutamic | 4.86 | 13.56 |
| Proline | 1.45 | 4.05 |
| Glycine | 1.45 | 4.05 |
| Alanine | 1.63 | 2.55 |
| Valine | 1.64 | 2.58 |
| Methionine | 0.48 | 1.34 |
| Isoleucine | 1.47 | 4.10 |
| Leucine | 2.63 | 7.34 |
| Tyrosine | 1.16 | 3.24 |
| Phenylalanine | 3.51 | 9.79 |
| Cystine | 0.39 | 1.09 |
| Tryptophane (Chemical) | 0.52 | 1.45 |

As stated, and as illustrated by the test results set forth hereinafter, the soy products of the invention display markedly enhanced and superior liquid sorption and emulsifying properties. Thus, my products are capable of abosrbing up to approximately 10 parts of water to one part of product or up to 10–14 times its weight in water at room temperature, up to approximately 6 parts of oil to one part of product or up to 2.5–3 times its weight in oil at room temperature and large amounts of other liquids such as up to approximately 6 parts of isopropyl alcohol to one part of product. In contrast, the best soy products presently available absorb up to 7 parts of water to one part of product, up to 2 parts of oil to one part of product and up to 3 parts of isopropyl alcohol to one part of product.

Because of its superior water and oil sorption properties, the soy products of the invention are useful in various applications, including industrial and edible products, which require thickening, emulsifying, dispersing, stabilizing, flocculating, fixing or holding of water and/or oil and/or solvents of various types. Among the fields of usage for my novel soy products may be mentioned agricultural sprays, calking compounds, oil refining, soaps and industrial powders, foundry products, polishes and cleaning waxes, explosives, absorbent papers, mining, water treatment, cosmetics, pharmaceuticals, and gravy-type pet foods. The soy products of the invention may also be used in various food products such as cake mixes, package soup mixes, spreads, oil-base salad dressings, icings, candies, cereals and meat products. For example, it has been found that the soy products of the invention are particularly useful in reducing cooking shrinkage in meat products such as meat patties and the like. In fact, the unexpected oil and water emulsifying properties of the invention provide greatly improved reduction in shrinkage losses in meat products. The emulsifying properties of the product bind and hold both fat and the aqueous juices found in the meat to retain them on cooking.

The following examples illustrate the invention:

EXAMPLE 1

Clean, dehulled, defatted soy flakes (100 parts) which had been heat treated sufficiently for solvent removal, but not highly denatured, were slurried with water (1,000 parts) to which had been added calcium hydroxide (2 parts). The resulting mixture was stirred for 30 minutes at a temperature of 80° F. and the extracted product was then separated from the extract by wet mechanical screening. The solid extracted product was again slurried with water (1,000 parts) at a temperature of 80° F. for 10 minutes and expressed in mechanical dewatering machinery to a semi-dry pulp.

The semi-dry pulp, representing approximately one-third of the original flakes (dry weight basis) was formed into granules and dried in a conventional tunnel dryer at a temperature of 180° F. for a period of 90 minutes. The analysis of the dried granules was as follows:

| | |
|---|---|
| Protein (dry basis) | 35.5% |
| Moisture | 7.0% |
| Ash | 4.0% |
| pH (water slurry) | 7.5 |

EXAMPLE 2

In order to compare the liquid absorption properties of the product of Example 1 with those of available soy products, samples of 3 typical commercial soy products and the special soy product of Example 1, all in 50-mesh powder form, were placed in beakers. Measured volumes of water, vegetable oil and isopropyl alcohol, respectively, at a temperature of 70° F. were added to a sample of each product and mixed in with 2 minutes of hand stirring. The volume of each liquid absorbed (with no bleeding of free liquid from the paste formed) by each sample before the mixture became fluid enough to pour from the beaker was recorded as follows in terms of the volumes of liquid absorbed per 1 part by weight of the soy products:

| Soy Product | Volumes Water Absorbed | Volumes Vegetable Oil Absorbed | Volumes Isopropyl Alcohol Absorbed |
|---|---|---|---|
| Soy flour, high solubility type | 3.5 | 2.0 | 3.0 |
| Soy protein concentrate | 5.0 | 1.7 | 2.5 |
| Isolated soy protein high absorption type | 7.0 | 2.0 | 2.5 |
| Soy product of Example 1 | 9.0 | 4.0 | 6.0 |

EXAMPLE 3

The following test was carried out to demonstrate that the superior absorption properties of the soy products produced by the process of the invention may be utilized to combine two incompatible liquids such as oil and water into a homogeneous paste. The same powdered soy products were employed as in Example 2 and to a sample of each was added a sufficient volume of vegetable oil at 70° F. was then added and hand-stirred until a non-pourable smooth paste was obtained with no free liquid. The amounts of oil and water combined with each part by weight of each sample powder was recorded as follows:

| Soy Product | Volumes Absorbed |
|---|---|
| Soy flour, high solubility type | 2 vol. oil with 3 vol. water |
| Soy protein concentrate | 2 vol. oil with 4.5 vol. water |
| Isolated soy protein high absorption type | 2.5 vol. oil with 6.0 vol. water |
| Soy product of Example 1 | 4.5 vol. oil with 7.0 vol. water |

Comparable results may be achieved in producing other homogeneous combinations of incompatible liquids such as water and gasoline, oil and alcohol, etc.

EXAMPLE 4

The following test was carried out to demonstrate the importance of effecting removal of more than 60 percent, preferably 65 percent or more, of the aqueous-alkaline soluble substances from the starting material during the extraction step in order to produce a soy product having the desired properties.

One sample of clean, dehulled, defatted and desolventized soy flakes (1 part) was slurried with water (10 parts) containing no alkaline material for a period of 5 minutes at a temperature of 70° F. The resulting slurry was separated in a cheesecloth bag and the extracted product was shaped into granules by forcing through a screen having a 0.0964 inch mesh and dried in a tunnel dryer for 1 hour at a temperature of 180° F. The granules were then corn mill ground to pass 100 mesh. The mild extraction conditions employed resulted in removal of 45 percent of the water soluble substances, including carbohydrate and proteinaceous materials, from the starting material. The soy product produced by the above procedure exhibited a bitter, beany flavor.

Following the procedure of Example 2, it was found that one part of the soy product absorbed 5 volumes of water and 1.6 volumes of vegetable oil.

A separate sample of clean, dehulled, defatted and desolventized soy flakes (1 part) plus calcium hydroxide (0.02 parts) was slurried with water (10 parts) for a period of 20 minutes at a temperature of 70° F. The resulting slurry was separated in a cheesecloth bag, wash water was added to the extracted product in the bag and then the product was re-squeezed dry. The extracted product was shaped into granules by forcing through a screen having a 0.0964 inch mesh and dried in a tunnel dryer for one hour at a temperature of 180° F. The granules were then corn mill ground to pass 100 mesh. The more thorough extraction conditions employed resulted in removal of 70 percent of the aqueous-alkaline soluble substances, including carbohydrate and proteinaceous materials, from the starting material. The soy product produced by the above procedure exhibited a bland flavor.

Following the procedure of Example 2, it was found that one part of the soy product absorbed 9 volumes of water and 3.2 volumes of vegetable oil.

EXAMPLE 5

The extraction procedure of Example 1 was followed to produce an extracted product in the form of a semi-dry pulp.

One sample of the wet extracted product was spray dried through an air/product nozzle with the spent air at a temperature of 225° F. The time of drying was about 5 seconds. The dried soy product was then screened to pass 200 mesh. Following the procedure of Example 2, it was found that one part of the resulting soy product absorbed 8 volumes of water and 6 volumes of vegetable oil. The soy product had a bulk density of 12 lb./cu. ft. and, under microscopic examination, had the appearance of large, long sections of cellular material.

A second sample of the wet extracted product was formed into ⅛ in. granules and dried in a tunnel dryer for a period of 1 hour at a temperature of 180° F. The dried soy product was then hammer mill ground to pass 200 mesh. Following the procedure of Example 2, it was found that one part of the resulting soy product absorbed 7 volumes of water and 3 volumes of vegetable oil. The soy product had a bulk density of 20 lb./cu. ft. and, under microscopic examination, had the appearance of roughly square, regular fragments of cellular material.

A third sample of the wet extracted product was dried in a rotary kiln at a temperature of 350° F. for a period of 1 hour. The dried soy product was then hammer mill ground to pass 200 mesh. Following the procedure of Example 2, it was found that one part of the resulting product absorbed 3.5 volumes of water and 1.8 volumes of vegetable oil. The soy product had a bulk density of approximately 22–24 lb./cu. ft. The product was discolored as compared with the products produced by spray drying and tunnel drying under the conditions described above.

EXAMPLE 6

Clean, dehulled, defatted and desolventized soy flakes (10 parts) were slurried with water (100 parts) to which had been added sodium hydroxide (0.2 parts) and sodium sulfite (0.1 part). The mixture was stirred for 30 minutes at a temperature of 80° F. and then separated in a Mercone C-400 centrifuge. The solids were collected and reslurried with water (100 parts) at a temperature of 80° F. for 20 minutes. The slurry was then separated in a Mercone C-400 centrifuge. The extracted product was formed into granules by forcing through a screen having a 0.0964 inch mesh and tunnel or oven dried at a temperature of 200° F. for 1 hour.

The resulting soy product exhibited excellent water and oil absorption capacity.

EXAMPLE 7

Clean, dehulled, defatted and desolventized soy flakes (10 parts) were slurried with water (100 parts) to which had been added calcium hydroxide (0.15 parts). The mixture was stirred for 20 minutes at a temperature of 90° F. The solids were separated from the extract and reslurried with water (100 parts) at a temperature of 90° F. for 20 minutes. The extracted product was separated from the extract, formed into granules and tunnel or oven dried at a temperature of 160° F. for 2½ hours.

The resulting soy product exhibited excellent water and oil absorption properties. In particular, the resulting product produced food emulsions having greatly improved properties. I have found that the material produced by the process of the invention may be added to meat products to produce an improved food product which does not exhibit the loss normally present in preparation by cooking. In particular, a superior meat patty can be produced using the resulting soy product. The patty formed using the product has the great advantage of being less expensive in formulation than standard patties and also is superior in retaining a greater proportion of fat and aqueous juices and other standard patty mixes. The protein content of the patty is increased by the added soy product and flavor and texture are enhanced.

It is well known that there are considerable portions of our commercial type of meats that result in waste, since they either contain an excessive amount of fat or are too tough to make an attractive consumer product. As a result, such less desirable meats are sometimes discarded, put into animal foods, rendered into lard and fats or sold at very low prices. Unfortunately, many of these meats are very flavorful and contain nutritious amounts of protein, yet up to the present time, no wholly successful product or use has been discovered to make such meats particularly desirable for human consumption.

Many additive or extender type of materials have been added to presently acceptable lower priced meats to make them more flavorful, increase the bulk and reduce their cost. For example, cereals, bread crumbs gluten, processed starch, vegetable gums, etc., have been added to meats such as ground beef to achieve the above-described results. However, it is widely recognized that meats of a high fat content or being characteristically very tough are not always a saleable or profitable product which is ordinarily suited for human consumption. The addition of currently available additives or extenders to these types of meats still has not provided a wholly satisfactory product.

A well recognized disadvantage of meats having a relatively high fat content is the amount of shrinkage of such meats during ordinary cooking processes. The consumer must purchase an amount in excess of what would ordinarily be required of less fatty-type meats to obtain a cooked meat product of suffcient size and weight.

It would, therefore, appear to be advantageous to provide a meat product which would utilize meats which are less desirable because of high fat content or characteristic toughness, and yet be flavorful, nutritious and contain a relatively high percentage of protein or at least more than is present in fat cuts of meat.

In accordance with the present invention, a new and improved food product is provided in a composition comprising (a) a meat portion, said meat portion normally containing at least about 5 percent by weight fat based on the total weight of the meat portion, (b) a protein comprising the protein material previously described, and (c) water and optional binders, flavoring and food coloring. The protein material is normally present in the total composition in an amount from about 3½ to about 10 percent by weight based on the total composition. Although the above is a preferred composition, it is to be understood that the composition of the invention can also be obtained in a composition comprising the protein material only and a meat portion.

The term "meat" as used herein is intended to include ordinary meats such as beef, lamb, pork, fowl, fish and the like.

The method of mixing together the above materials is not critical; however, it is necessary that the product be mixed sufficiently thoroughly that the emulsifier is distributed uniformly enough throughout the mix to be able to bind the water and fat.

In addition to the meat and protein emulsifier material itself, the mixture may contain optional binders, flavoring, coloring, etc. Suitable binders that may be employed include egg albumen, isolated soy protein, and the like. It has been found that from about 5 to about 30 percent by weight of additional binder is satisfactory in the protein portion to provide sufficient cohesiveness to the ultimate protein-meat composition, i.e. to improve the composition's resistance to crumbling or breaking apart under normal handling conditions or during the cooking process. Although any of the above-mentioned binders may be employed in the invention, it has been found that isolated soy protein is particularly useful; however, it is not necessary to use any binders under most circumstances. Various commercially available meat flavors may be added to the protein portion to provide additional or different flavors. Also, various spices and colors can be employed to provide desirable flavoring and appearance. If the protein emulsifier material is added in a dry or powdered form, water will normally be added to hydrate the emulsifier material.

The protein emulsifier portion of the composition serves a very important function. The protein emulsifier portion may be admixed with a meat composition containing a high percentage of fat, e.g. from about 20 to about 75 percent by weight fat. A resulting product can be obtained which contains a higher percentage of protein than does the meat portion alone and a correspondingly lower amount of total fat. Therefore, the protein mixture provides a means for economically "upgrading" low grades of meat to provide a high protein meat product which is reasonably priced to the consumer.

In addition, the protein emulsifier may be admixed with lean cuts of meat, e.g. meats containing below about 20 percent by weight fat, to provide a means of extending or increasing the bulk of such meats and still retain a desirable meaty texture. In each mixture, the protein portion not only serves as an extender, but also tends to retain a substantial amount of the aqueous natural juices within the meat mixture which otherwise would be lost during the cooking process.

The superior emulsifying and sorptive properties of the protein material produced by the invention, due to the modified cellular, sponge-like character of the product, is able to sorb a greater proportion of the aqueous juices and fats released during the cooking step in preparing meat-type products. The fats and aqueous juices are emulsified and held in the modified cellular structure, e.g. formed from the particulate cellular material produced by alkaline extraction of soybean oil meal and/or flakes. Even prior to cooking, for example, after mixing of a meat product such as a meat patty, the modified cellular structure sorbs and emulsifies aqueous juices and fat to provide a stable meat product.

The meat portion employed in the composition of the invention can be selected from a variety of commercially available types of meat. The present invention has its most practical application where the meat portion contains from about 20 to about 75 percent fat based on the weight of the meat portion alone. In order to provide meat products having a high protein content, yet being economical to produce, it is currently the practice to mix, for example, about one part of a high fat content meat with about 4 parts of a lean meat. Such a procedure utilizes high fat content meats, but because it requires the use of high priced lean cuts of meat, the resulting mixture is still relatively expensive. It has now been discovered that, by the composition of the present invention, high fat content meats can be admixed with the protein portion, as hereinbefore described, to obtain a resulting meat composition having a substantially higher percentage of protein than that present in the meat alone. Such a meat composition eliminates the necessity and cost of employing lean, expensive meats and yet provides a product which is flavorul and nutritious, has a desirable texture, and more important, is economical to produce.

Another advantage of the meat compositions of the invention is the increased speed at which a particular composition will cook as compared with the slower cooking speed of an "all meat" portion of the meat employed in the composition, said meat portion being of comparable weight and size and being cooked under the same conditions.

The following examples are illustrative of this facet of the invention, but are not intended to limit the scope thereof. In place of the particular meat materials used in the examples, other meats may, of course, be substituted to obtain meat compositions providing substantially the same result.

EXAMPLE 8

A patty mix costing approximately 40 cents per pound uncooked was prepared by mixing:

53 pounds lean boneless beef
40 pounds beef flank meat
28 pounds water
7 pounds of the spray dried protein emulsifier produced as described in Example 5.

The material was ground through a standard meat grinder having a 3/16 inch hole plate, mixed on a Hobart mixer for about 5 minutes, and formed into 45 gram patties. Twenty sample patties were fried on a 350° F. griddle for 1½ minutes per side. The average weight loss of the patties was 22.37 percent of the original weight.

EXAMPLE 9

A comparative patty formulation using a soy grits extender coating costing 42 cents per pound uncooked was prepared by mixing:

53 pounds lean boneless beef
40 pounds beef flank meat
21 pounds water
7 pounds soy grits The mix was prepared and cooked as described in Example 8. The average weight loss was 30.13 percent.

EXAMPLE 10

A comparative all meat patty formulation costing 55 cents per pound uncooked was prepared by mixing:

60 pounds lean boneless beef
40 pounds beef flank meat

The mix was prepared and cooked as described in Example 8. The average weight loss was 30.18 percent.

EXAMPLE 11

A second comparative patty formulation using a soy grits extender and costing 45 cents per pound uncooked was prepared by mixing:

55 pounds lean boneless beef
40 pounds beef flank meat
5 pounds soy grits
15 pounds water The mix was cooked and prepared as described in Example 8. The average weight loss was 29.63 percent.

The properties of the cooked patties are compared in the following table:

TABLE I

| Example | No. of Samples | Cost Per Pound Uncooked | % Weight Loss | Observation |
|---|---|---|---|---|
| 8 (patty using novel soy product) | 20 | 40 cents | 22.37 | substantially circular, firm, good taste and texture |
| 9 (patty using soy grits) | 20 | 42 cents | 30.13 | substantially circular, good texture, but soy off flavor |
| 10 (all meat patty) | 20 | 55 cents | 30.18 | irregular shape, substantial shrinkage and curling, good taste and texture, not cooked as well as Example 8 |
| 11 (patty using soy grits) | 20 | 45 cents | 29.63 | substantially circular, good texture, but soy off flavor |

EXAMPLE 12

Parallel samples of meat patties containing the spray dried product of Example 5, no emulsifier and soy grits were prepared from ground, deboned chicken containing 68.4% water, 18.7% fat and 12.5% protein. The moist, ground chicken was mixed with the dry, powdered emulsifier or soy grits to form a homogeneous mix and formed into patties on a hand patty former. The patties were cooked as described in Example 8. The results of the comparison are shown in Table II.

TABLE II

| % Emulsifier | No. of Replications | Weight per Patty | % Weight Loss After Cooking | Observations |
|---|---|---|---|---|
| 0 | 5 | 46.6 gm. | 40.4 | very sticky, not machine workable, shrivelled on cooking, did not retain shape - high fry loss, bad taste and texture |
| 7 - soy grits | 5 | 46.2 gm. | 22.2 | sticky, shrivelled on cooking and did not retain shape, better than 1, probably not machine workable, large fry loss, acceptable texture and taste |
| 5 - soy grits | 5 | 46.3 gm. | 30.6 | same as 2, but greater fry loss |
| 7 - spray dried product of Example 5 | 5 | 46.4 gm. | 10.4 | machine workable, retained shape on cooking, uniform and little shrinkage, not sticky, taste and texture very acceptable |

It is apparent from the results shown by the above illustrative examples that the patty product produced using applicant's process possesses great advantage over products known in the art. The product exhibits great advantages by enhancing moisture retention, taste, texture and cooking properties. Other advantages will be apparent to those skilled in the art.

I claim:

1. A method of preparing an improved food product which exhibits a shortened time of preparation, increased retention of fat and aqueous juices on cooking, and which does not crumble and lose shape on cooking, comprising mixing a meat portion containing fat and as an emulsifier a dehulled, defatted, desolventized soy meal protein product containing less than about 40 percent of the aqueous-alkaline soluble substances originally present in the soy meal and further containing between about 20 to 45 percent by weight of protein on a dry basis which has been dried at a temperature such that the temperature of the emulsifier is about 140°F.–250°F. for a period of approximately 180–60 minutes, the meat portion containing at least about 20% by weight fat based on the weight of the meat portion, binding the mixed portions together with 5–30 percent by weight of the non-meat portion of the mixture with a binder selected from the group consisting of albumen and isolated soy protein, and forming the mixed bound portions into a shape which does not crumble and break apart under normal handling and preparation, cooking the formed mixture and retaining the fat and aqueous juices with the protein emulsifier in the mixture.

2. The method of claim 1 wherein the protein emulsifier is added in proportions of between about 3½ and 10 percent by weight of the mix.

3. The method of claim 1 wherein the meat portion is selected from the group consisting of flank meat and navel meat.

4. The method of claim 1 wherein minor proportions of flavoring and coloring are added to the meat and emulsifier mixture.

5. The process of preparing a substantially bland, free-flowing, non-hygroscopic soy emulsifier product having improved liquid sorption and emulsifying properties comprising the steps of treating substantially dehulled, defatted and desolventized soy meal with an aqueous-alkaline material to solubilize and extract therefrom at least approximately 60 percent of the aqueous-alkaline soluble substances, separating the resulting extracted soy meal product from the extract and drying the extracted soy meal product under controlled drying conditions at a temperature such that the temperature of the extracted soy meal product is about 140°F. – 250°F. for a period of approximately 180 – 60 minutes to substantially avoid appreciable denaturization of the remaining protein in said extracted product and deleterious modification of the cellular structure of said extracted product.

6. The process of preparing a soy product as set forth in claim 5 wherein between approximately 60 percent and approximately 85 percent of the aqueous-alkaline substances are extracted from said soy meal and the resulting soy product has a bulk density of approximately 10–22 pounds per cubic foot.

7. The process of preparing a soy product as set forth in claim 5 wherein said extracted soy meal product is formed into granules prior to drying thereof.

8. The method of claim 5 wherein the extracted soy meal product is dried in a thermal dryer at a temperature of appproximately 180° F. for a period of approximately 60–90 minutes.

9. The process of preparing a soy product as set forth in claim 5 wherein the resulting soy product is mechanically reduced in size following drying thereof.

* * * * *

UNITED STATES PATENT OFFICE

CERTIFICATE OF CORRECTION

PATENT NO. : 3,885,052

DATED : May 20, 1975

INVENTOR(S) : Robert P. Starr

It is certified that error appears in the above-identified patent and that said Letters Patent are hereby corrected as shown below:

Column 2, line 37, "desoluentized" should read --desolventized--

Column 4, line 22, "heated" should read --heating-- line 59, "to" should read --and--

Column 14, line 39, "to" should read --and--

Signed and Sealed this

*nineteenth* Day of *August 1975*

[SEAL]

*Attest:*

RUTH C. MASON
*Attesting Officer*

C. MARSHALL DANN
*Commissioner of Patents and Trademarks*